US011920749B2

(12) United States Patent
Poon (Pan)

(10) Patent No.: US 11,920,749 B2
(45) Date of Patent: Mar. 5, 2024

(54) MODULAR LIGHTING KIT

(71) Applicant: Chi Wai (Zhiwei) Patrick Poon (Pan), Guangzhou (CN)

(72) Inventor: Chi Wai (Zhiwei) Patrick Poon (Pan), Guangzhou (CN)

( * ) Notice: Subject to any disclaimer, the term of this patent is extended or adjusted under 35 U.S.C. 154(b) by 186 days.

(21) Appl. No.: 15/863,915

(22) Filed: Jan. 6, 2018

(65) Prior Publication Data

US 2018/0187842 A1 Jul. 5, 2018

Related U.S. Application Data

(63) Continuation-in-part of application No. 15/539,883, filed as application No. PCT/CN2016/090987 on Jul. 22, 2016, now abandoned.

(30) Foreign Application Priority Data

Jul. 31, 2015 (CN) ........................ 201520575049.X
Jul. 22, 2016 (WO) ................ PCT/CN2016/090987

(51) Int. Cl.

| | |
|---|---|
| ***F21S 2/00*** | (2016.01) |
| ***F21S 9/02*** | (2006.01) |
| ***F21V 3/06*** | (2018.01) |
| ***F21V 3/10*** | (2018.01) |
| ***F21V 17/12*** | (2006.01) |
| ***F21V 21/096*** | (2006.01) |
| ***F21V 23/06*** | (2006.01) |
| ***F21Y 115/10*** | (2016.01) |

(52) U.S. Cl.
CPC ................ *F21S 2/005* (2013.01); *F21V 3/10* (2018.02); *F21V 21/096* (2013.01); *F21V 23/06* (2013.01); *F21S 9/02* (2013.01); *F21V 3/062* (2018.02); *F21V 17/12* (2013.01); *F21Y 2115/10* (2016.08)

(58) Field of Classification Search
CPC .... F21S 2/005; F21S 9/02; F21V 3/10; F21V 21/096; F21V 23/06; F21V 3/062; F21V 17/12; F21Y 2115/10
USPC .......................................................... 362/183
See application file for complete search history.

(56) References Cited

U.S. PATENT DOCUMENTS

| | | | | |
|---|---|---|---|---|
| 11,148,066 B2 * | 10/2021 | Zhu | ......................... | F21V 21/22 |
| 11,391,444 B2 * | 7/2022 | Wang | ......................... | F21S 2/00 |
| 2006/0134978 A1 * | 6/2006 | Rosen | .................. | H01R 13/514 439/581 |
| 2013/0163235 A1 * | 6/2013 | Chuang | ..................... | F21L 4/00 362/367 |
| 2014/0349544 A1 * | 11/2014 | Chien | .................. | A63H 33/042 446/91 |

FOREIGN PATENT DOCUMENTS

CN 302314677 S 2/2013

* cited by examiner

*Primary Examiner* — Andrew J Coughlin
*Assistant Examiner* — Jessica M Apenteng

(57) ABSTRACT

A modular lighting kit has a plurality of blocks of various shapes and sizes, including a powered master block and a plurality of unpowered slave blocks. The master block is illuminable independently. All blocks are magnetically attracted to each other and connect electrically when abutted together in any 2-D or 3-D arrangement such that all blocks are illuminated when connected directly or indirectly to the master block.

20 Claims, 14 Drawing Sheets

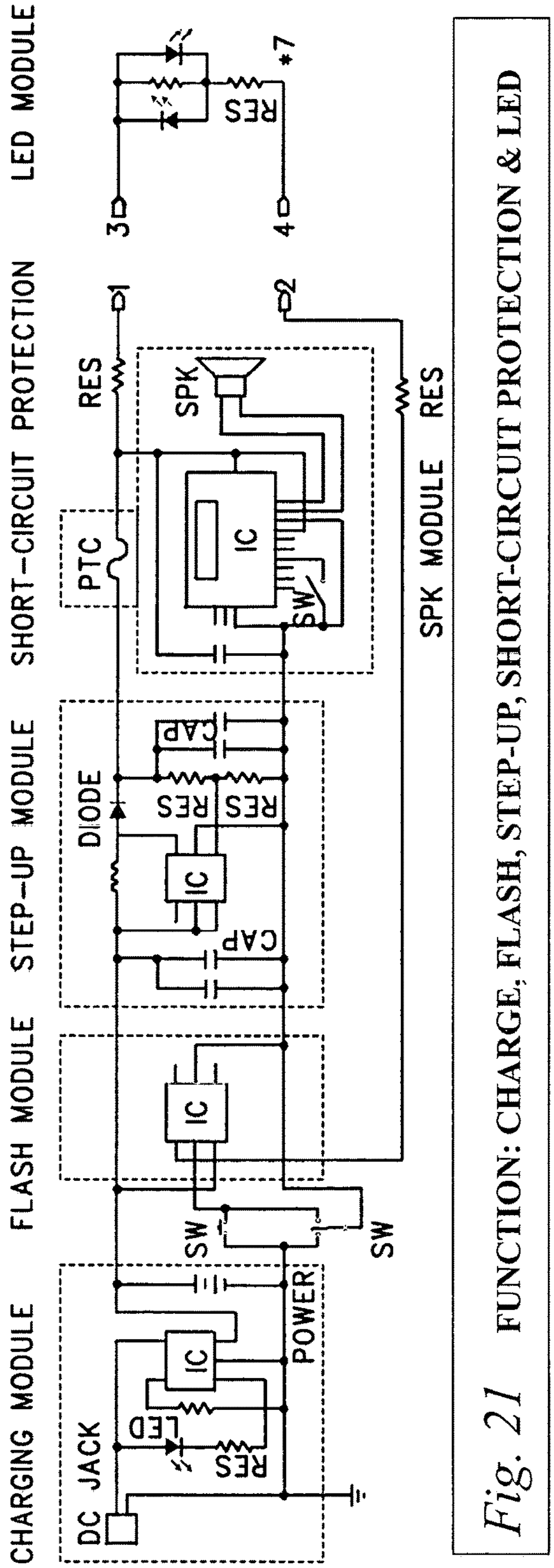
*Fig. 21* FUNCTION: CHARGE, FLASH, STEP-UP, SHORT-CIRCUIT PROTECTION & LED
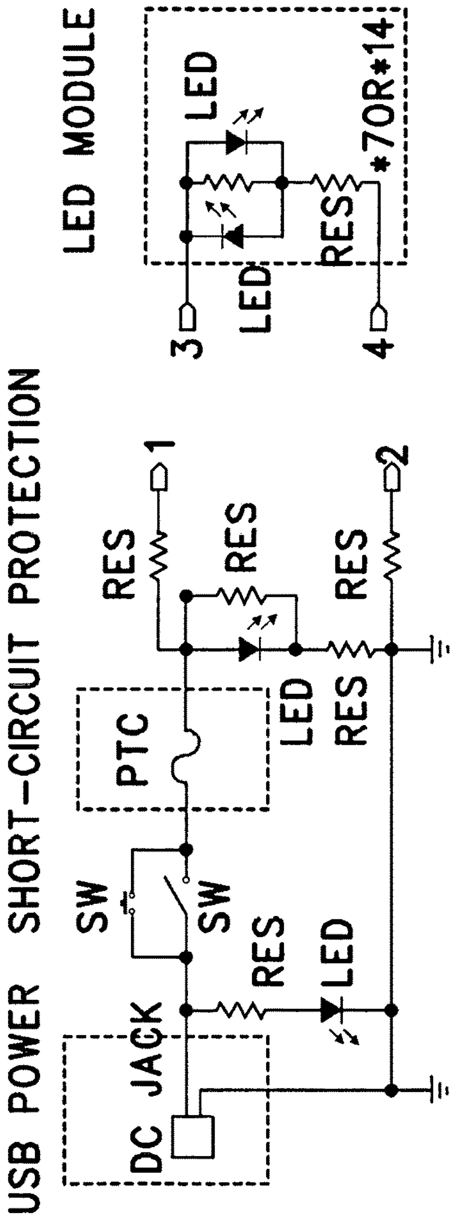
*Fig. 22* FUNCTION: USB POWER, SHORT-CIRCUIT PROTECTION & LED

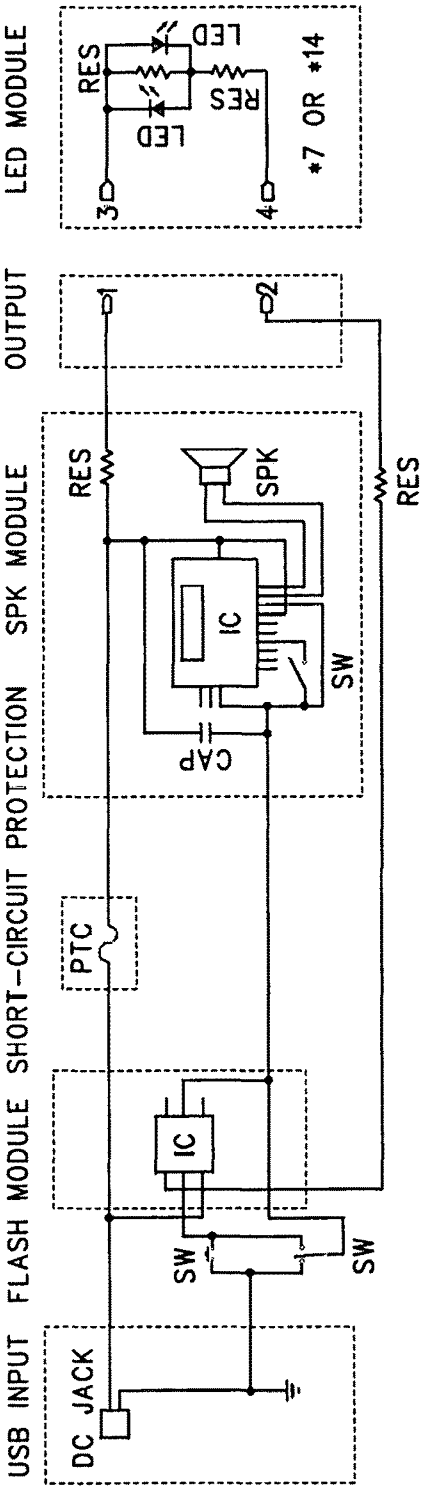
*Fig. 23* FUNCTION: USB INPUT, FLASH, STEP-UP, SHORT-CIRCUIT PROTECTION, SPEAKER, OUTPUT & LED
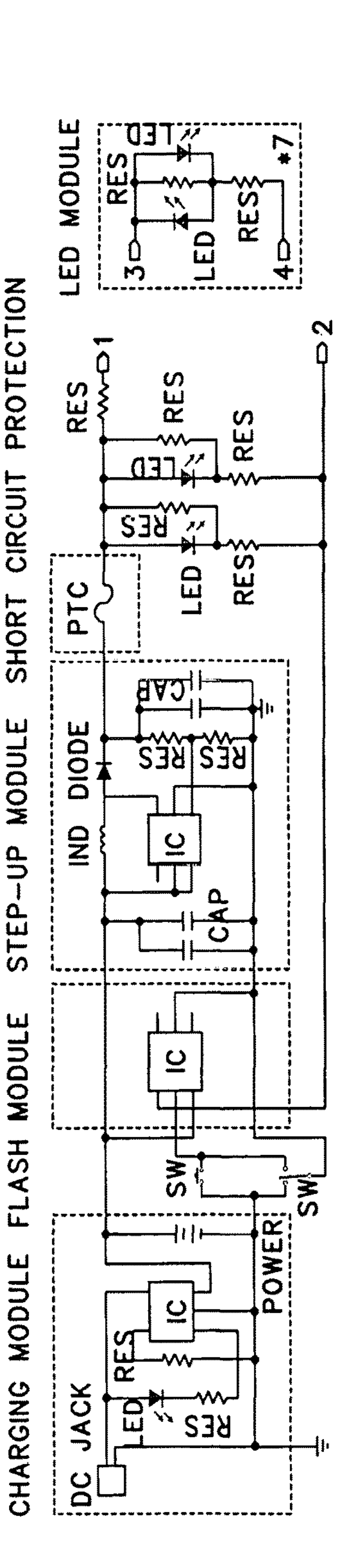
*Fig. 24* FUNCTION: CHARGING, FLASH, STEP-UP, SHORT-CIRCUIT PROTECTION & LED

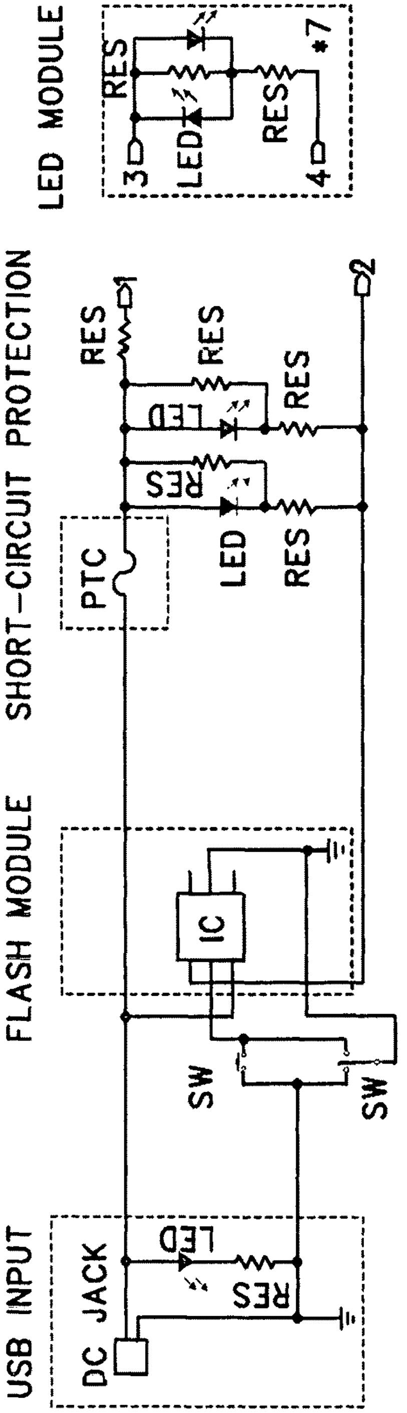
*Fig. 25* FUNCTION: USB INPUT, FLASH, STEP-UP, SHORT-CIRCUIT PROTECTION & LED
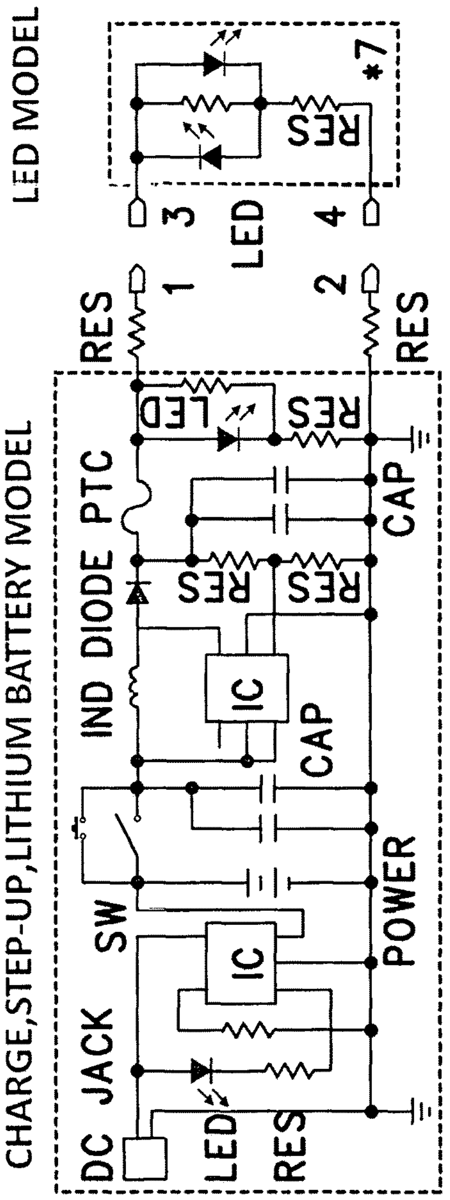
*Fig. 26* FUNCTION: CHARGE, STEP-UP, LITHIUM BATTERY & LED

MODULAR LIGHTING KIT

RELATED APPLICATIONS

This application is a Continuation-in-Part of U.S. patent application Ser. No. 15/539,883 filed on 26 Jun. 2016, which is the US national phase of International Application Number PCT/CN2016/090987, filed on 22 Jul. 2016, which designated the U.S. and which claims benefit of CN201520575049.X, filed 31 Jul. 2015. Priority there-to-all is claimed, and the entire contents of all are hereby incorporated by reference.

FIELD OF THE INVENTION

The present invention is related to lighting devices and devices for self-entertainment. Specifically, the invention is related to modular lighting kits which a user can construct in a virtually infinite number of arrangements, such as for "S.T.E.A.M." (Science, Technology, Engineering, Arts & Mathematics), educational magnetic light block construction, self-entertainment, and for lighting.

BACKGROUND OF THE INVENTION

Modular lamp kits, such as the Tetris Stackable LED Desk Lamp (www.thinkgeek.com/product/f034/) are well known. However, such prior art devices have numerous shortcomings. Among those shortcomings, such devices require gravitational force between contacts for effective connection. Intermittent or poor connections are commonplace, making the lights dim or go out. Reliable side by side connections are almost impossible to achieve. Stacked modules of such devices, which are relatively light in weight, tends to fall or tip over easily. Additionally, they are useful only to build planar (2-D) arrangements. More importantly, the modules can short circuit, and be damaged or go dark when intersecting each other in certain configurations, thus limiting creativity in designing the modules.

Accordingly, there is a need, and it is an object of the invention, to provide a modular lighting kit which connects very positively and not only by gravity. There is also a need, and it is also an object of the invention, to provide such a modular lighting kit in which the blocks can connect to each other side-by-side or in overhanging configurations. There is also a need, and it is also an object of the invention, to provide such a modular lighting kit which is more reliable during construction and won't fall or tip over easily. There is also a need, and it is also an object of the invention, to provide such a modular lighting kit which may be used to construct 3-D arrangements. There is also a need, and it is also an object of the invention, to provide such a modular lighting kit which is less prone to short-circuiting by improper arrangement, but enables endless creativity in designing in 3D.

Further needs and objects exist which are addressed by the present invention, as may become apparent by the included disclosure of an exemplary embodiment thereof.

SUMMARY OF THE INVENTION

The present invention may be embodied in or practiced using a modular lighting kit having a plurality of three-dimensionally rectilinear blocks of various shapes and sizes, including a powered master block and a plurality of unpowered slave blocks. The master block may be independently illuminable. All blocks may be magnetically attracted to each other and connect electrically when abutted together in any two-dimensional (2-D) or three-dimensional (3-D) arrangement, such that all of the blocks are illuminated when connected directly or indirectly to the master block. Each block may contain an LED light source, a plurality of self-aligning magnets, a pair of oppositely-poled and electrically-disconnected conductive frames, and a plurality of translucent wall panels. The master block may contain means for electrical power such as a battery or an AC connector. The master block may include control means for turning illumination on and off or for selecting various modes of illumination, such as continuous illumination or pulsed illumination. The frames may include contact portions which are proud of the blocks and shaped and arranged to interface with the contact portions of abutting blocks to provide a continuous electrical pathway between the abutted blocks. The contact portions may be shaped and arranged to reduce the possibility of short-circuiting when blocks are improperly juxtaposed. The frames of each block may also be shaped and arranged to interface with the electrical components within the blocks to provide convenient and reliable electrical connections easily, inexpensively, and without wiring.

The invention may be embodied in or practiced using a modular lighting kit having a plurality of blocks, including a master block and a plurality of unpowered slave blocks. Each of the blocks may include electrical components including at least a light source. Each of the blocks may include a plurality of magnets. The master block may include an electrical power source. The light source of the master block may be illuminable by the electrical power source. Each of the blocks may include a pair of electrically conductive peripheral frames. Each of the frames may be electrically isolated from the other of its pair except through the electrical components within the associated block. Each frame may have evenly-spaced apart proud contacts. The magnets may cause aligned coupling between any two blocks brought into close proximity. The proud contacts may be shaped and configured to enable the two coupled blocks to connect electrically while preventing inadvertent short-circuiting of the pair of peripheral frames of one of the blocks by one of the peripheral frames of the other.

Each of the blocks may have a shape created by the aligned joining of identical cubes. Each of the blocks may have a shape created by the aligned joining of cubes, each cube having an edge length of L or some multiple thereof. The shape may be taken from the group including; an elongated row of the cubes, a T-shaped arrangement of the cubes, an X-shaped arrangement of the cubes, a Z-shaped arrangement of the cubes, an L-shaped arrangement of the cubes, a square arrangement of the cubes, a cubic arrangement of the cubes and a rectangular arrangement of the cubes. Each of the cubes having of six square faces, they may include front and rear translucent square faces and at least two side square faces. The front and rear translucent square faces may allow transmission of light from the light source of the associated block and the side faces may include the proud contacts.

The proud contacts may be disposed at diagonally opposed corners of the associated square faces. The magnets may each be disposed centrally between a pair of the diagonally opposed corners. The magnets may be cylindrically-shaped and have semi-cylindrically-shaped opposite magnetic poles, and may be retained by the blocks so that the opposite poles of the magnets of proximate blocks may rotate freely into magnetic attraction as the blocks are coupled.

Each light source may be on a PC board having an electrical contact surface at each of two opposite ends thereof, and each of the contact surfaces may be electrically and mechanically received by a different one of the associated block's pair of electrically conductive peripheral frames. The pair of electrically conductive peripheral frames may be made metallically-plated plastic. The pair electrically conductive peripheral frames may be attached together by electrically conductive fasteners, and the metallically-plated plastic may have non-conductive portions to prevent electrical short-circuiting between the pair by the fasteners.

Further features and aspects of the invention are disclosed with more specificity in the detailed description and drawings provided herein.

DESCRIPTION OF THE DRAWINGS

FIG. 21 is a diagram of charging module, flash module, step-up module, short-circuit protection and LED module circuit for use in the first or second embodiments;

FIG. 22 is a diagram of a USB-powered, short-circuit protection, and LED module circuit for use in the first or second embodiments;

FIG. 23 is a diagram of a USB-input, flash module, short-circuit protection, SPK module, output, and LED module circuit for use in the first or second embodiments;

FIG. 24 is a diagram of a charging module, flash module, step-up module, short-circuit protection and LED module circuit for use in the first or second embodiments;

FIG. 25 is a diagram of a USB-input, flash module, short-circuit protection, and LED module circuit for use in the first or second embodiments;

FIG. 26 is a diagram of a charge module, step-up module, and LED module circuit for use in the first or second embodiments;

DETAILED DESCRIPTION OF EXEMPLARY EMBODIMENTS

Referring to the included Drawings, two block configurations are shown which are in accordance with or useful in practicing the invention; the larger blocks of FIGS. 1 through 14, and the smaller blocks of FIGS. 15 through 17A. The blocks of each size are useable either with themselves or together with the blocks of the other size, as demonstrated in FIGS. 18 through 20. Circuit diagrams for variously-functioning blocks are shown in FIGS. 21 through 26.

For the purpose of this disclosure and the appended claims, the term "3-D rectilinear" is meant to define a shape that is cubic or created by aligning two or more imaginary cubes side-by-side or one-atop the next in any combination. For instance, a single imaginary cube may be abutted side-by-side against an identical single imaginary cube such that they share a common wall and their overall periphery would thereby create a 3-D rectilinear shape that would be herein referred to as a "2×1 linear block". With the single imaginary cube having an edge length "L", the 2×1 linear block would have a depth of L, a height of L, and length of 2L. If another identical imaginary cube was added so that all three imaginary cubes were aligned co-linearly, the 3-D rectilinear shape created would be herein referred to as a "3×1 linear block". The 3×1 linear block would have a depth of L, a height of L, and length of 3L. Eight identical imaginary cubes arranged together into a larger cube shape would create a 3-D rectilinear shape that would be herein called a "2×2 cubic block", having a depth, a height and a length all of 2L. Other possible 3-D rectilinear shapes include L-shape blocks, T-shaped blocks, U-shaped blocks, etc. having a variety of N×N shape designations according to the number of imaginary cubes forming the walls and the arrangement into which they are configured. A block arranged by having a common corner cube with one block atop it and two cubes aligned beside it would be referred to as a "3×2 L-shaped block". The blocks used in FIG. 1 are all created by an arrangement of identical imaginary cubes having an edge length of "L", so that all of the edges of all of the blocks are some multiple of "L".

Also for the purpose of this disclosure, each block will be referred to as either a "master" block or a "slave" block. The slave blocks contain lighting means but have no source of energy. The master block, of which there is only one used at a time, has lighting means and a source of energy which may not only illuminate itself but may illuminate a plurality of slave blocks connected electrically thereto, directly or through other slave blocks. The master block also has addition circuitry and electrical controls that are absent in the slave blocks.

Figure 1:
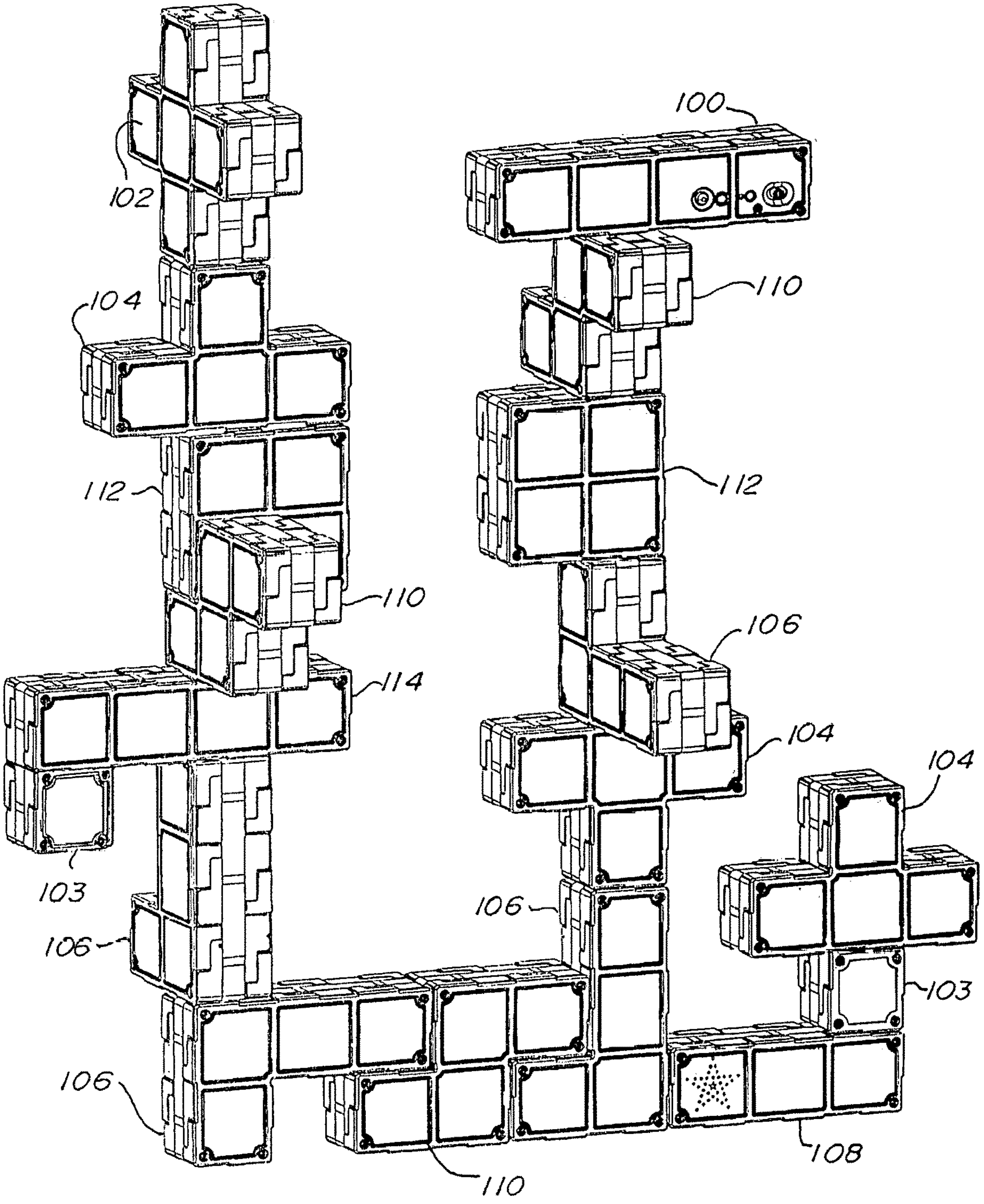
FIG. 1 is a perspective view of a connected 3-D arrangement of blocks according to a first embodiment.

Referring to FIG. 1, blocks of some of the wide variety of possible 3-D rectilinear shapes within the invention are shown in an assembled "3-D" arrangement. Included is a 4-up linear master block 100, a 3×3 X-shaped slave block 102, two 1×1 slave blocks 103, three 3×1 T-shaped slave blocks 104, four 3×2 L-shaped slave blocks 106, a 3×1 linear slave block 108, three 2×2 Z-shaped slave blocks 110, two 2×1 square slave blocks 112, and one 4×1 linear slave block 114.

While the blocks may be arranged and will work properly in a flat "2-D" configuration (imagine that all of the blocks are lying on the plane that FIG. 1 is drawn on with no cubes projecting towards you or away from you), a novelty of these blocks is that they may be arranged and will work properly when in such "3-D" configurations as shown in FIG. 1, having some blocks lying on the plane, some projecting into it, and some projecting out from it. This ability is enabled by the shape and arrangement of the electrically interconnecting contacts, as will be later explained.

Figure 4:
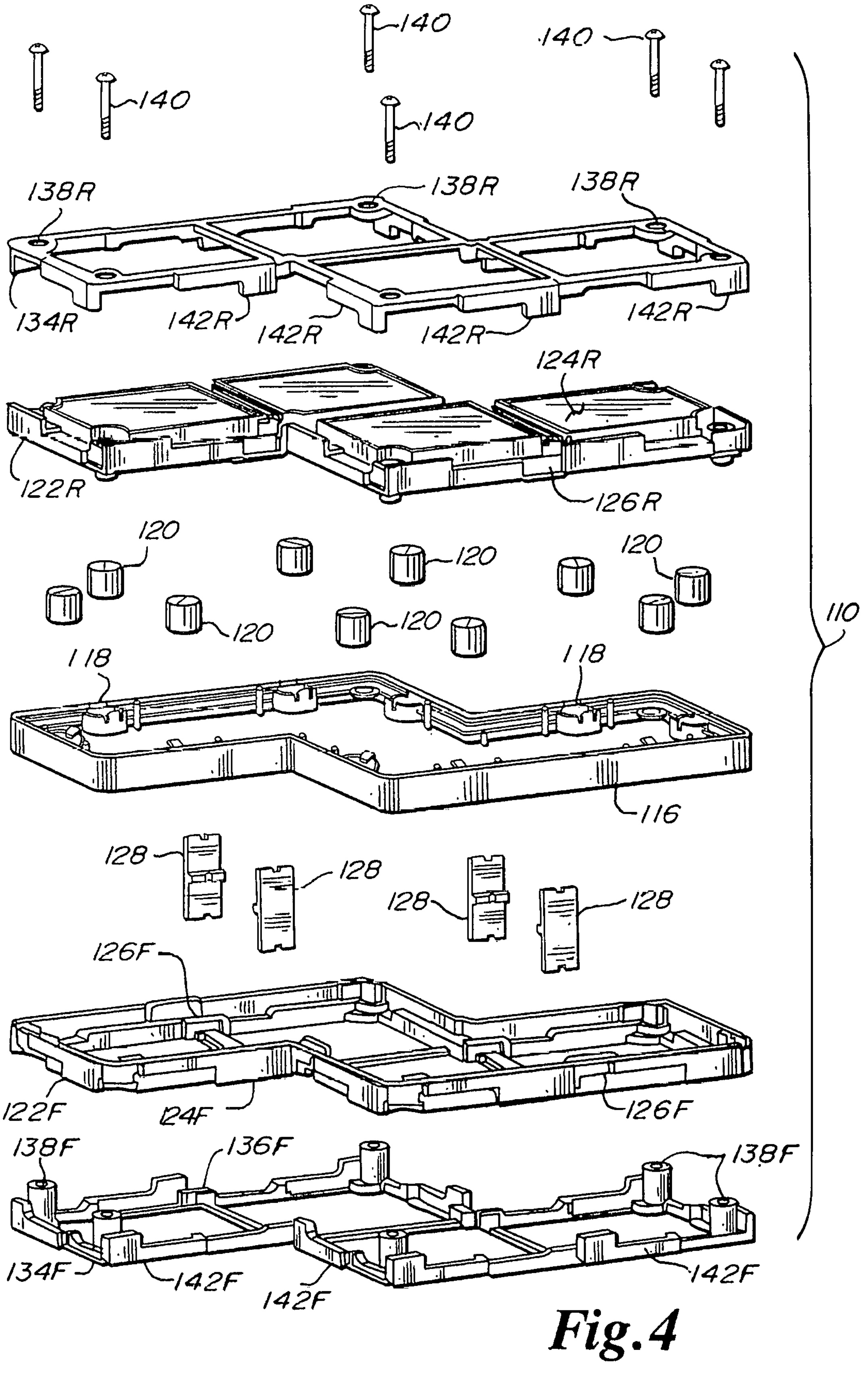
FIG. 4 is an exploded view of one of the slave blocks of FIG. 1.

Referring next to FIG. 4, a 2×2 Z-shaped slave block 110 is shown in an exploded state so that all of its components can be seen, which are typical in most regards to the components of the blocks of other shapes. While the blocks can be used together in any common orientation, FIG. 4 is intended to show the Z-shaped slave block with its forward face at the bottom of the figure and its rearward face at the top of the figure. So references like "forward", "rearward", etc., related to this figure, and references like "front", "back", "right", "left", "top" and "bottom", etc., throughout this disclosure (wherever not otherwise identified), should be interpreted accordingly.

The initial component during assembly of the block is the Z-shaped central frame 116, which is made of an electrically non-conductive material, preferably and injection molded plastic. The central frames of the other shaped blocks have a periphery shaped accordingly, but are otherwise of the same general construction. Each block's central frame includes a plurality of spaced apart magnet retainers 118. In the case of the 2×2 Z-shaped blocks, that plurality is ten because that is the number of cube lengths around the perimeter of the frame. In the other shaped blocks, the number of magnet retainers is according to the number of cube lengths around the perimeter of each of those central frames. Each magnet retainer is disposed in the middle of each cube length. Other features of the central frames provide structure to receive, engage, and position other components as will be explained.

Figure 11:
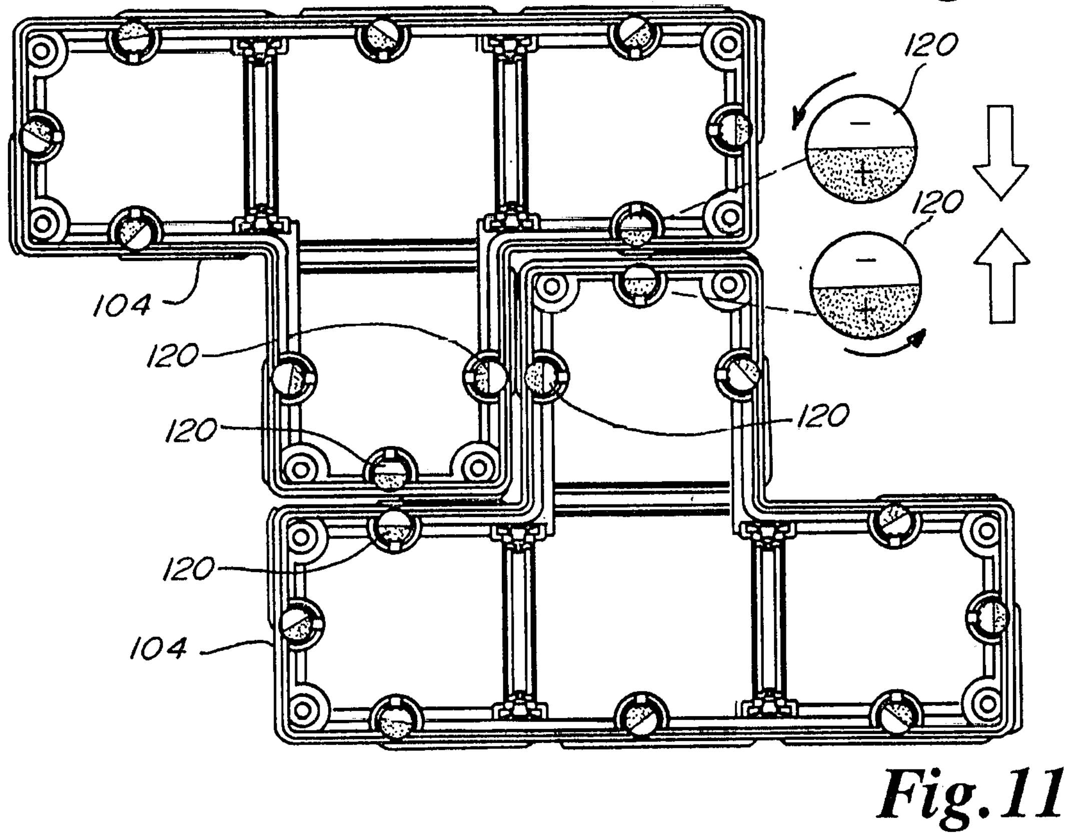
FIG. 11 is a cross-sectional view of the slave blocks of FIG. 10 connected together.

Cylindrical magnets 120 are next inserted from behind into each of the magnet retainers. The magnets are semi-circularly polarized as shown in FIG. 11, and are held into the magnet retainers by small flexible rearwardly-projecting clips molded integrally with the frames and magnet retainers. Although unable to fall out of the retainers once snapped in, the magnets are held in the retainers loosely enough so that they may rotate freely around their circular peripheries under the forces of their own magnetic power, for reasons that will be explained later.

Z-shaped forward translucent cover 122F is next positioned against the forward side of the central frame and the peripheries thereof are fitted together. As with the central frames, each block's forward translucent cover has a peripheral shape according to the overall block shape. No gluing or fastening is required to hold the central frame and forward cover together, as these components will be permanently fastened together later in the assembly. The forward translucent cover is preferably made of a clear plastic which is tinted with a vibrant color. On its front face 124F it is embossed with four proud square outlines, each indicating a front face of one of the four imaginary cubes which created its 2×2 Z-shape. Other blocks have a different number of proud square outlines to indicate the imaginary cubes that created their shapes.

The forward cover includes two slots 126F, each for receiving a PC board 128. Each of the other shaped blocks has a number of such slots according to the size and configuration of the block, because these PC boards include an LED that will be energized when the blocks are interconnected to illuminate the blocks' interiors. So larger blocks or blocks with more complicated shapes require addition PC boards to have their interiors fully illuminated. In the case of the master block, which will be described later, additional features will be required in the forward cover to receive and retain other electrical components, but while the forward covers of the other shaped slave blocks have a periphery shaped accordingly, those are otherwise of the same general construction.

Figure 5:
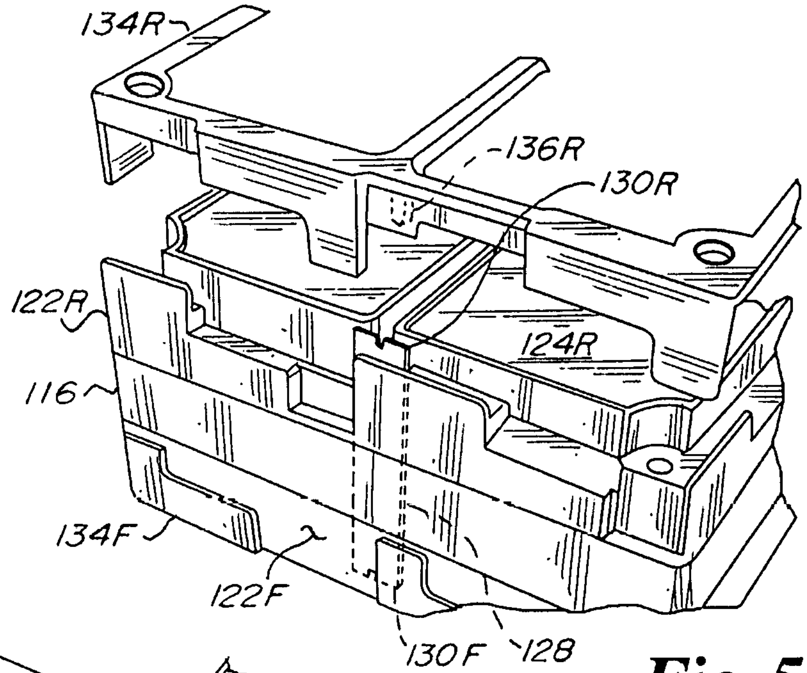
FIG. 5 is a partial exploded view of the PC board portion one of the blocks of FIG. 1 from outside of the block.
Figure 6:
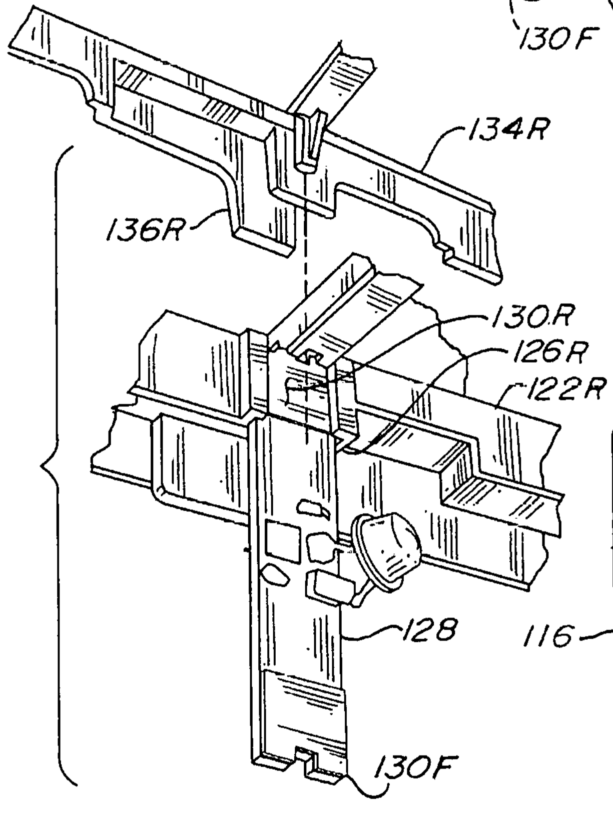
FIG. 6 is a partial exploded view of the PC board portion the block of FIG. 5 from inside of the block.
Figure 7:
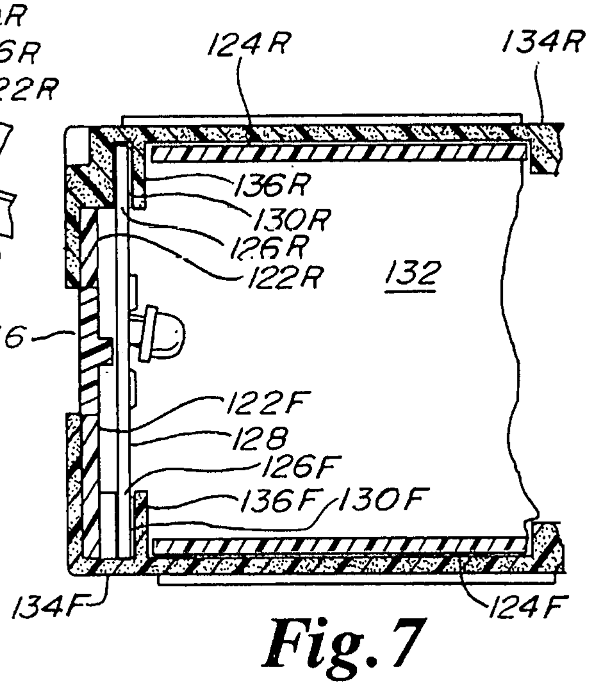
FIG. 7 is a partial cross-sectional view of the PC board portion the block of FIG. 5.

The typical LED PC board 128 is best understood with reference to FIGS. 5 through 7, where it can be seen that each end of the board includes an electrical connection pad 130F and 130R and that an LED and other electronic components are mounted to the board midway between, facing towards the interior of the block. While FIGS. 5-7 show a soldered-on bulb-type LED, the LED may more preferably be an SMT type.

The forward half of each LED PC board is positioned into a slot 126F with the rearward half projecting rearwardly. Because the central frame and forward cover are electrically non-conductive, the PC boards are not yet electrically connected, although the LED and other electronic components on the board are electrically connected to connection pads 130F and 130R.

Next, Z-shaped rear translucent cover 122R is positioned against the rear side of the central frame and the peripheries thereof are fitted together. As with the central frames and forward covers, each block's forward translucent cover has a peripheral shape according to the overall block shape. For all slave blocks, the rear translucent cover is a mirror image of the block's forward cover, having the same number and location of similar but oppositely-directed slots 126R, which are each fitted over and capture the associated LED PC board as the rear cover and central frame are mated together around their peripheries. Still, no gluing or fastening is yet required. The rear translucent cover is preferably made of the same clear plastic as the forward cover, and is tinted with the same vibrant color. While the covers of all of the same-shaped blocks are preferably tinted with the same color (for instance, all of the 2×2 Z-shaped blocks may be tinted blue), the other variously shaped blocks are preferably tinted with different vibrant colors (for instance, all of the 3×2 L-shaped blocks may be tinted red and all of the 3×1 linear blocks may be tinted yellow).

The rear cover's rear face 124R is embossed with the same, but in mirror-image, four proud square outlines as the front face of the mating forward cover, each indicating a rear face of one of the same four imaginary cubes which created its 2×2 Z-shape. And again, other blocks have a different number of proud square outlines to indicate the imaginary cubes that created their shapes.

When the two mating covers are brought together, we now have a subassembly the includes the central frame, and the forward and rear translucent covers in the 2×2 Z-shape, having a hollow interior chamber 132 in which are disposed the two LED PC boards. And the connection pads 130F and 130 R of both PC boards are accessible at the outsides of each of slots 126F and 126R.

Next, the forward and rearward contact frames 134F and 134R are attached to the forward and rear translucent covers, respectively. The contact frames have the same 2×2 Z-shaped peripheries, and form the forward and rear other peripheral edges, respectively, of the block once they are properly attached. The contact frames are electrically conductive, and may be made of metal, such as by die-casting, but are more preferably made of injection-molded plastic with a conductive metallic plating applied there-over. The contact frames include connectors 136 F and 136R for receiving pads 130F and 130R in electrical communication therewith, so that the forward contact frame becomes electrically connected to the rear contact frame through the circuitry on the PC boards once the contact frames are properly attached to the translucent covers.

The contact frames are mirror images or each other, except that the rear contact frame has clearance holes 138R at each of its outside corners for allowing fastening screws 140 there-through, while the front contact frame has screw holes 138F aligned therewith which are of a smaller diameter for threadedly receiving and engaging the screws. Self-tapping screws 140 are passed through clearance holes 138R and screwed into smaller holes 138F until the contact frames, covers, and central frames are all firmly pulled together, sandwiching the electrically-connected PC boards between the contact frames.

In the preferred arrangement, wherein the contact frames are made of metallically-plated plastic, the smaller diameter holes 138F of the front contact frame are masked during plating to ensure that the rear contact frame is non-conductive at its interface with the screws. This ensures that the forward and rear contact frames are not short-circuited and that the only path for electrical conductivity there-between is through the PC boards. Alternative means of eliminating such short-circuiting could be employed, such as the use of non-conductive fasteners instead of the screws.

The assembly of 2×2 Z-shaped slave block 110 is now complete, and is ready for use as in FIG. 1. The differently shaped slave blocks of figure one are assembled in the same fashion. It should be appreciated that the application of an appropriate voltage between the front and rear contact frames will cause the LED's inside each block to be illuminated, causing the entirety of the forward and rear translucent covers to glow in the block's tinted color.

It should also be appreciated that the blocks are magnetically attracted together by magnets 120. Even when the polarities of the magnets are initially opposing, the ability of the magnets to freely rotate enables and causes them to rotate into attractive alignment with the magnets of other blocks as they are being positioned together. This inspires adjacently-positioned blocks to assume a 3-D rectilinearly-aligned interface, and the construction of a multitude of blocks to assume a 3-D rectilinearly-aligned arrangement, with the face of one of a first block's imaginary cubes always exactly overlapping the face of one of a second block's imaginary cubes in rectilinear alignment, as seen if FIG. 1.

Figure 2:
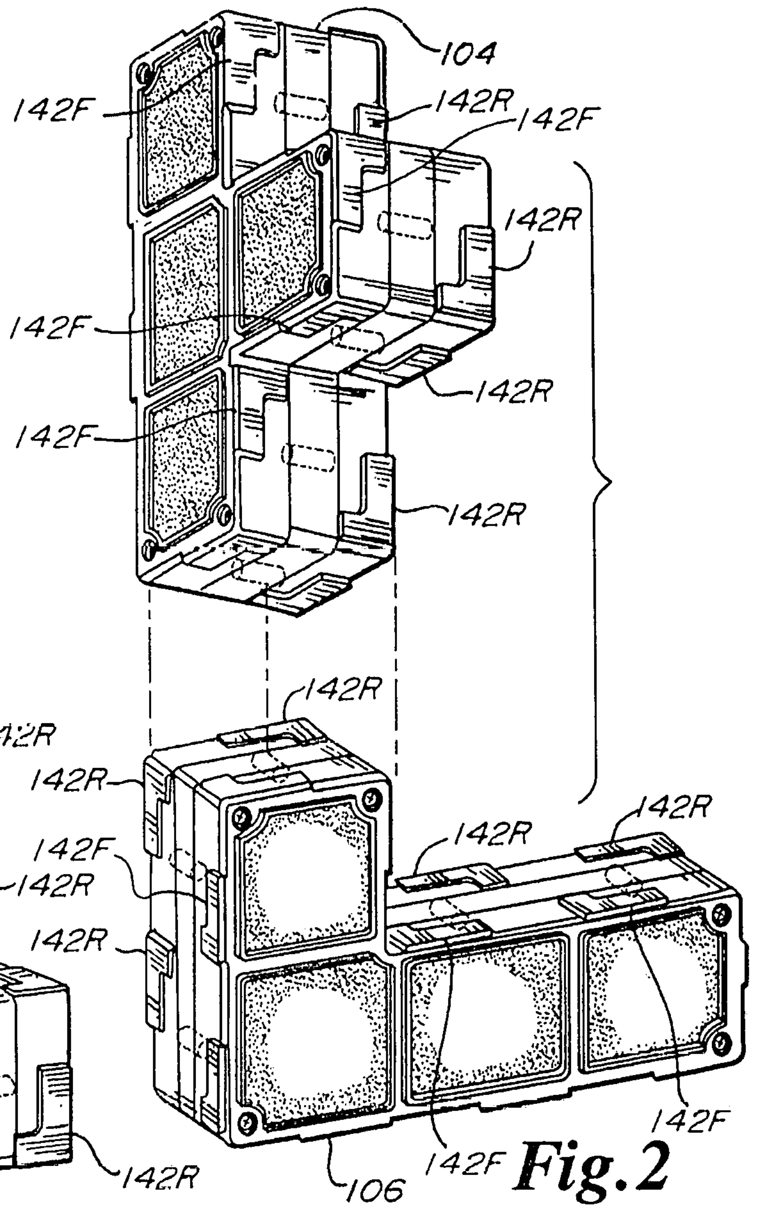
FIG. 2 is a perspective view of two of the slave blocks if FIG. 1 being brought into proximity with each other.
Figure 3:
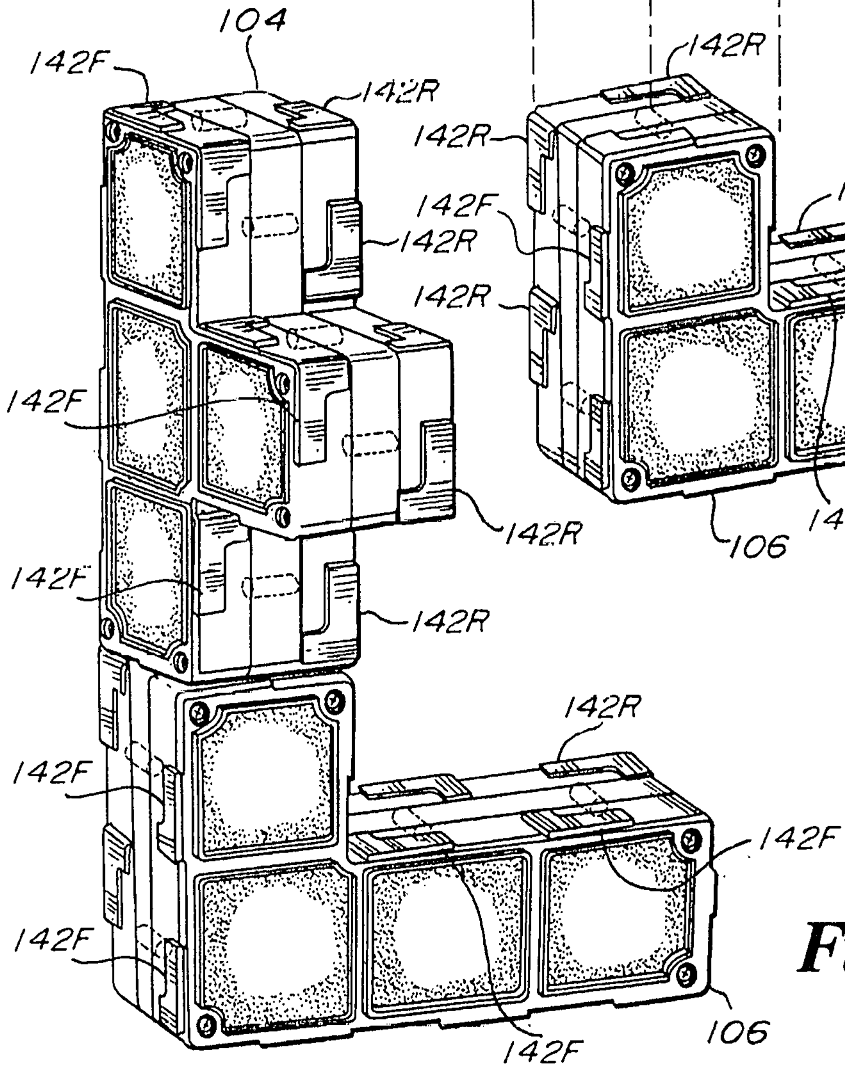
FIG. 3 is a perspective view of the slave blocks of FIG. 2 connected together.

Referring to FIGS. 2 and 3, it can be seen that the contact frames include spaced-apart L-shaped contact pads, 142F and 142R, spaced around and extending proudly from their non-forward and non-rear sides to serve as the intended electrical contact points between blocks that are brought together as in FIG. 1. The shape and spacing of these contact pads provides several non-obvious advantages. The remainder of the contact frames around their non-forward and non-rear sides, except these contact pads, become entrapped behind the associated translucent cover and are thereby electrically unexposed.

Referring back to the edge length "L" of the imaginary cubes used to create the overall shape of each block, all blocks have edges that are each some multiple of "L"; L, 2L, 3L etc. Accordingly, the contacts are spaced around the contact frames at "L" intervals, with the initial contact being aligned with an outside corner of the contact frame and the other contacts of that frame being repeated at distances of N×L there-from. In this way, the contacts on the forward contact frame are staggered in relation to the contacts on the rear contact frame, with each L-shaped contact aligned with an opposing corner of each of the imaginary cubes that created the block.

Figure 8:
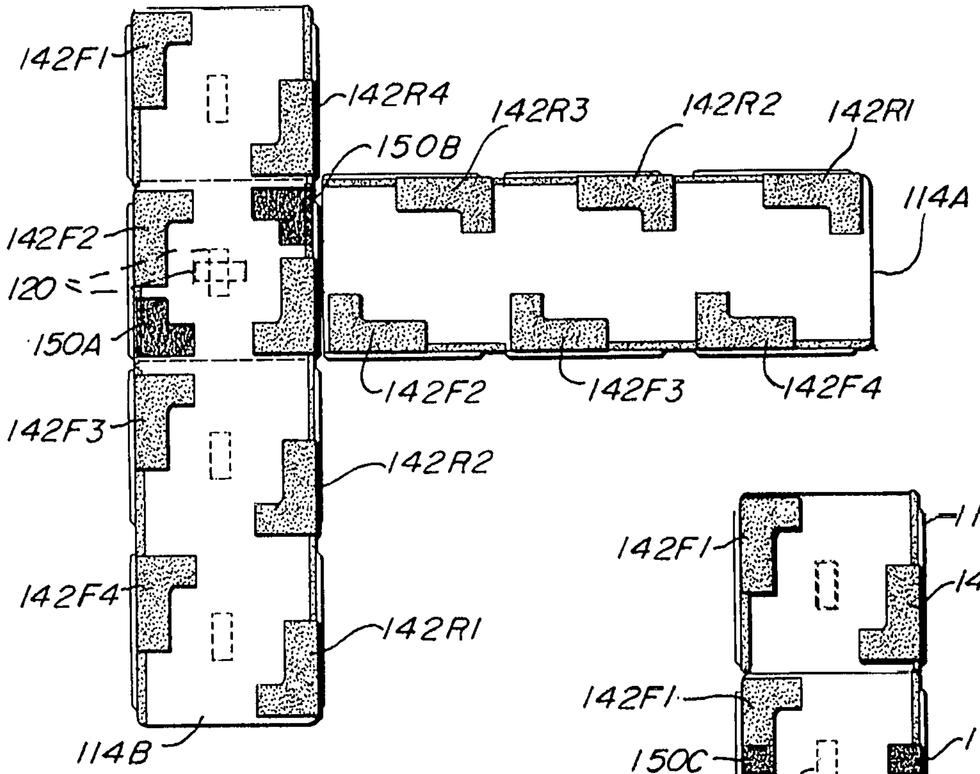
FIG. 8 is a top view of a connected 3-D arrangement of two of the blocks of FIG. 1.
Figure 9:
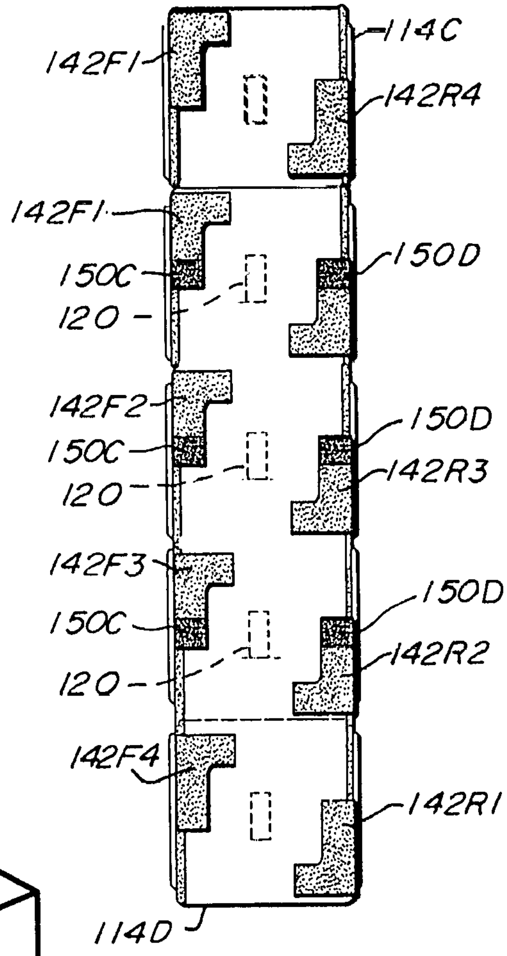
FIG. 9 is a top view of a connected 2-D arrangement of two of the blocks of FIG. 1.
Figure 27:
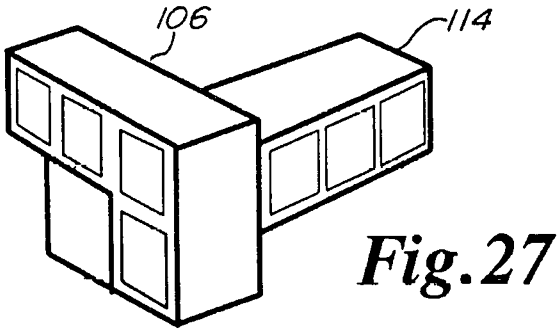
FIG. 27 is a perspective view of a connected 3-D arrangement of two of the blocks of FIG. 1.
Figure 28:
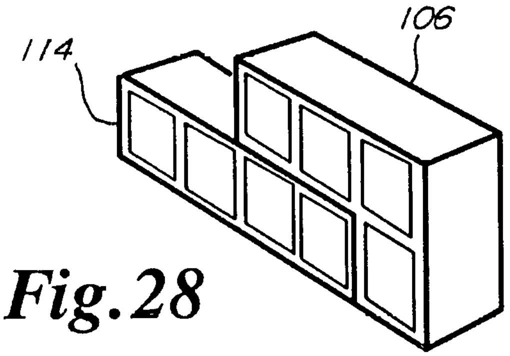
FIG. 28 is a perspective view of a connected 2-D arrangement of two of the blocks of FIG. 1.

FIGS. 8 and 9 show arrangements to demonstrate the electrical contact made when blocks are connected in 3-D and 2D fashion, respectively. The figures are simplified to remove details that are irrelevant to that goal.

Referring to FIG. 8, two 4×1 linear slave blocks 114A and 114B are connected in a 3-D arrangement, with block 114B aligned perpendicularly to and connected atop the left end of block 114A. The blackened areas 150A and 150B of the figure represent the portions of the L-shaped contacts on the bottom of block 114B and those on the top of block 114A that are in electrical contact during this arrangement. These contact areas occur on a plane that is between the two blocks and is actually not visible in this view, so the blackened areas are merely a representation.

Referring to FIG. 9, two 4×1 linear slave blocks 114C and 114D are connected in a 2-D arrangement, with the blocks linearly aligned but staggered so that block 114D is atop and parallel to block 114C, but offset by one imaginary cube. Again, the blackened areas 150C and 150D represent the portions of the L-shaped contacts on the bottom of block 114D and those on the top of block 114C that are in electrical contact during this arrangement. Again, these contact areas occur on a plane that is between the two blocks and is actually not visible in this view, so the blackened areas are again merely a representation.

Figure 9A:
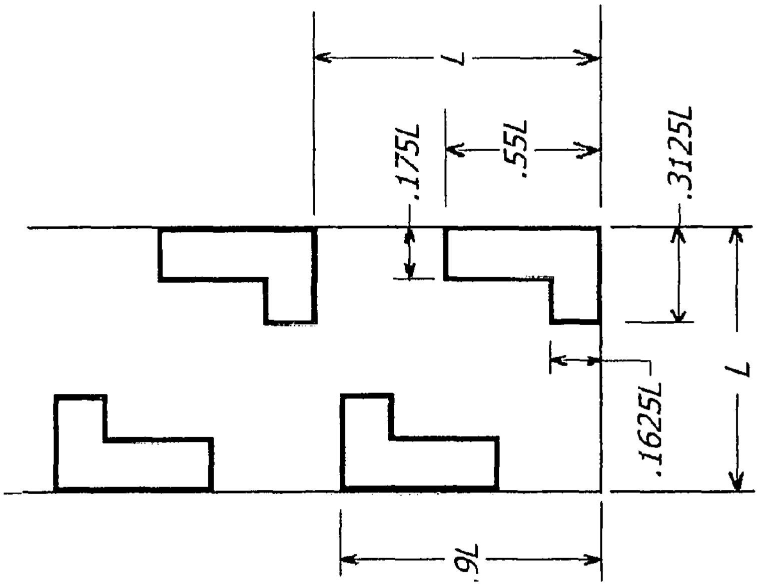
FIG. 9A is a schematic representation of the contact pads of the block of FIG. 9.

It can be seen that an L-shaped contact 142R1 is positioned atop and at the right rearward end (as those terms have been previously defined) of each block, and that an L-shaped contact 142F1 is positioned atop and at the left forward rearward end. The adjacent contacts inward of contact 142R1 are contacts 142R2, 142R3, etc., and the adjacent contacts inward of contact 142F1 are contacts 142F2, 142F3, etc. While not viewable in these two figures view, the L-shaped contacts the bottom sides are identically configured and would be numbered the same in a theoretical bottom view, so that contact between the blocks in FIGS. 8 and 9 can only occur within the blackened portions FIG. 9A is a simplified schematic representation to show the relative dimensional configuration of the L-shaped contacts. This arrangement allows for electrical contact as shown in FIGS. 8 and 9, while preventing inadvertent short-circuiting by preventing the front or back contacts of one block contact from simultaneously touching both the front and the back contacts of another block.

Figure 10:
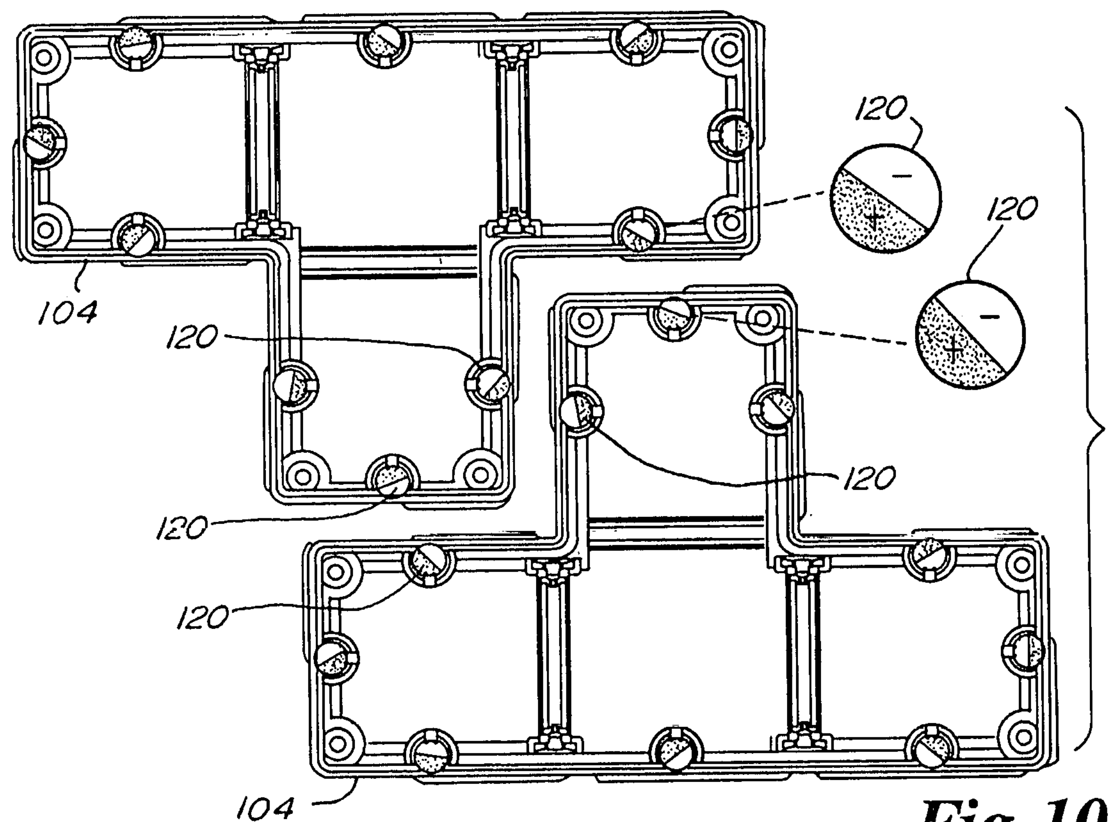
FIG. 10 is a cross-sectional view of two of the slave blocks if FIG. 1 being brought into proximity with each other.

FIGS. 10 and 11 show the self-aligning capability of magnets as two 3×1 T-shaped slave blocks 104 are brought together. The magnets each have semi-cylindrical polarity such that one side of the magnet is positively charge (+) and the other is negatively charged (−). As previously mentioned, the magnets are free to rotate about their cylindrical axes. This allows one of both of any two adjacent magnets to automatically rotate into a magnetically attractive relationship. The position of each magnet at the geometrical center between the L-shaped contacts of each imaginary cube ensures that the imaginary cubes become perfectly aligned as the blocks come into contact.

Figure 12:
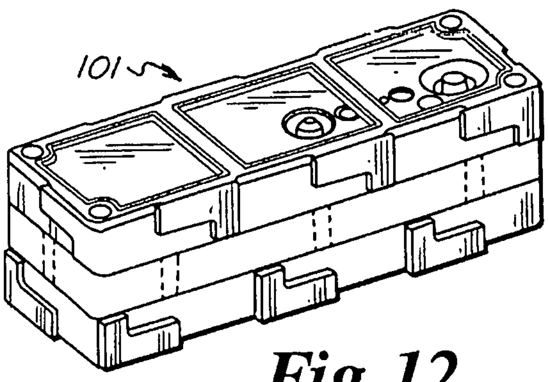
FIG. 12 is a perspective view of a master block of the embodiment of FIG. 1.
Figure 13:
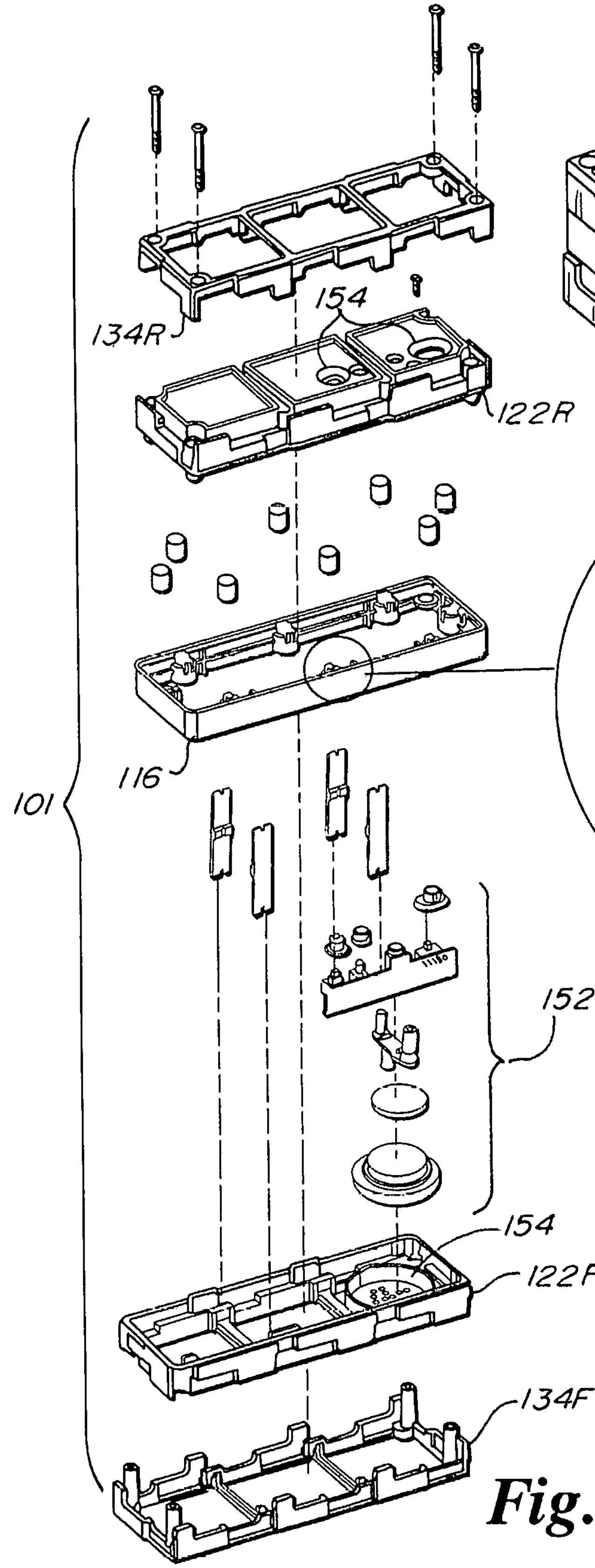
FIG. 13 is an exploded view of the master block of FIG. 12.

FIGS. 12 and 13 show a 1×3 linear master block 101. For simplification, identical part numbers for the center frame 116, front and rear translucent covers, 122F and 122R, respectively, and front and rear contact frames, 134F and 134R, respectively, are used as were used in FIG. 4 for slave block 110. The master block is similar in component and assembly as slave block 110, except that the master block includes additional electrical/electronic components 152, and the front and rear translucent covers include additional features 154 for receiving/securing these components. Such additional components include means for powering both the master block and all slave blocks connected either directly or indirectly thereto. This means for powering may be a replaceable or rechargeable battery, a jack or USB connector for connection to an electrical power supply or a battery charger. The components may also include a noise-maker such as a piezo, a buzzer, or a speaker, and circuit boards for driving the noise maker or illuminating the LEDs according to various operational modes, such as steady or flashing illumination. The components may include a switch for turning the master block and connected slaves on or off, or for also selecting an operational mode.

Figure 14:
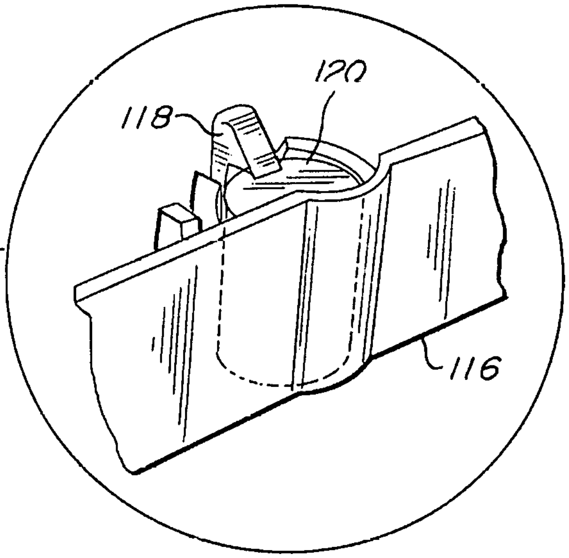
FIG. 14 is a close-up view of the magnet portion of the master block of FIG. 13.

FIG. 14 shows a close-up view of the captured magnet 120 with magner receiver 118 of the central frame 116.

Figure 15:
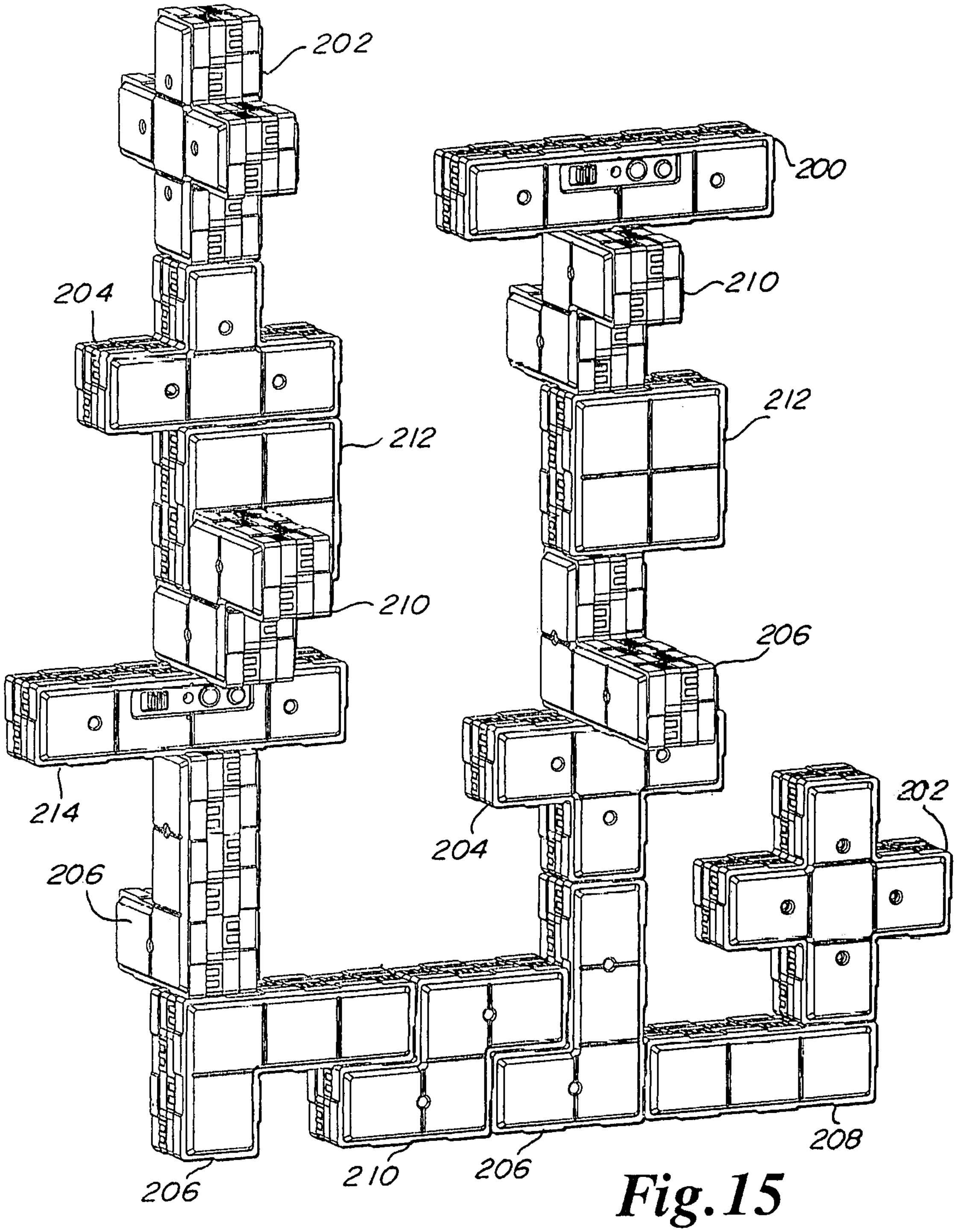
FIG. 15 is a perspective view of a 3-D arrangement of blocks according to a second embodiment.

Referring next to FIGS. 15 through 17A, a second version of blocks are shown, being connected into a 3-D assembly in FIG. 15. For brevity, all similar components of this second embodiment are assigned similar item numbers as were used for the first embodiment, except that where items in the first embodiment used 1XX item numbers, items in the second embodiment use 2XX numbering. For example, because a 3×2 L-shaped slave block of the first embodiment was assigned item number 106, a 3×2 L-shaped slave block of the second embodiment is assigned, or should be assumed to have, item number 206, even when not referred to in this disclosure. For brevity again, item numbers may be shown in FIGS. 15 through 17A which are not specifically referred to in this disclosure, reference being made to the disclosure for FIGS. 1 through 14 for an explanation thereof.

Figure 17A:
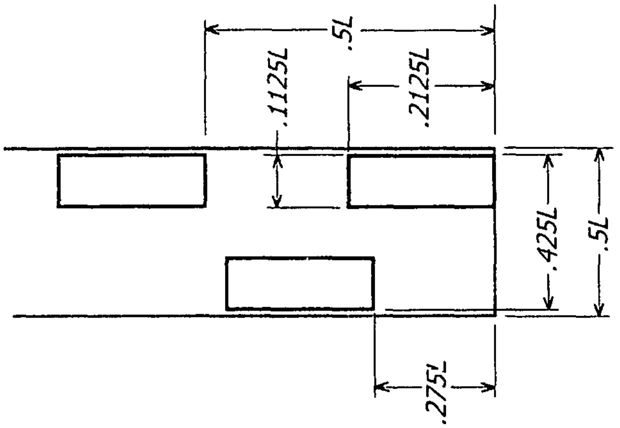
FIG. 17A is a schematic representation of the contact pads of the block of FIG. 17.
Figure 16:
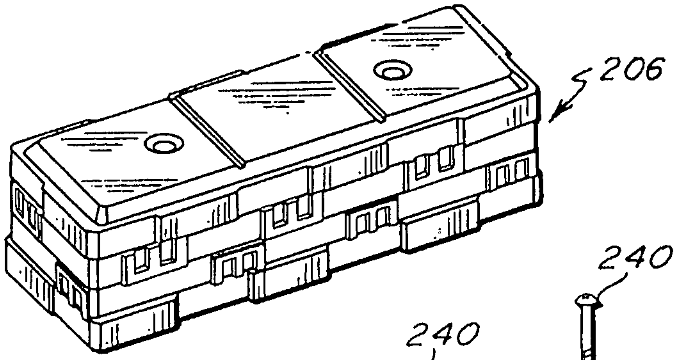
FIG. 16 is a perspective view of one of the slave blocks of FIG. 15.
Figure 17:
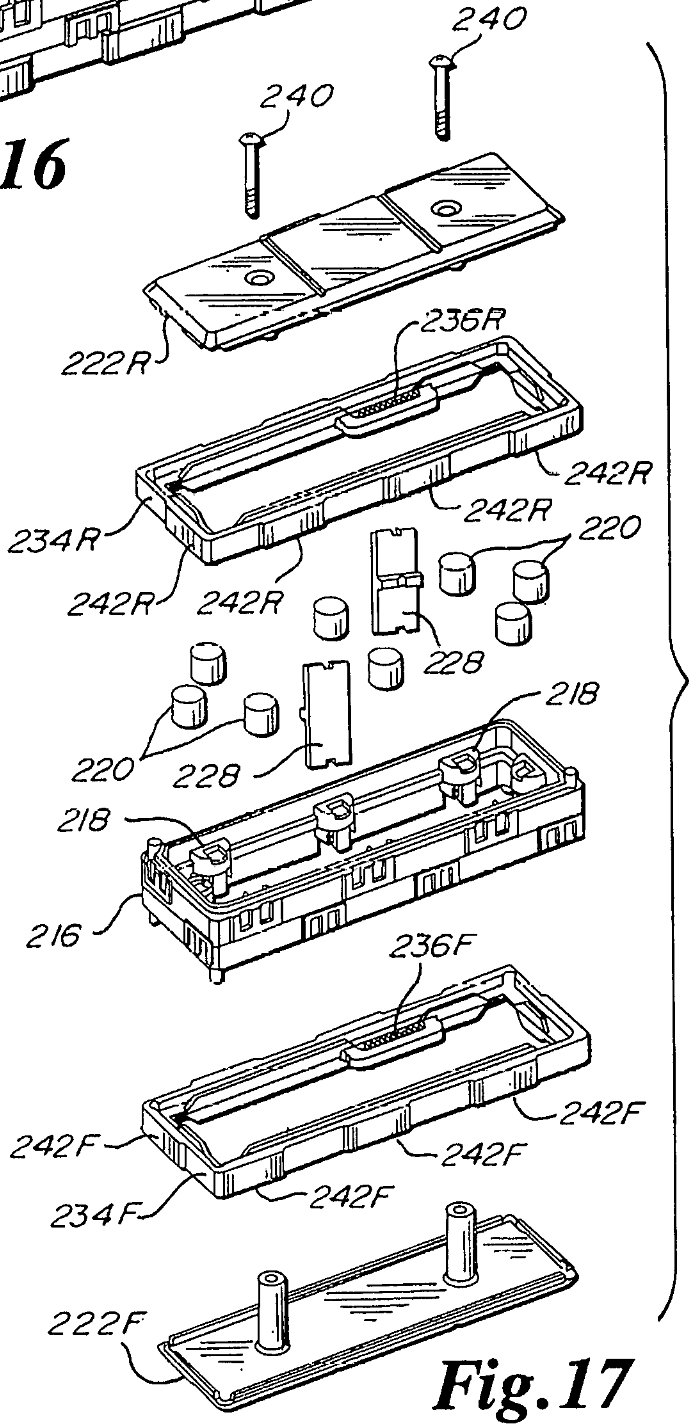
FIG. 17 is an exploded view of the slave block of FIG. 16.

FIGS. 16 and 17 show a 1×3 linear slave block 106. One can readily appreciate that assembly thereof is similar to the assembly of block 110 of FIG. 4, except that in this embodiment the front and rear contact frames 222F and 222R, respectively, are assembled to center frame 216 prior to assembly of front and rear translucent covers 222F and 222R, respectively. It can also be seen that front and rear contacts 242F and 242R, respectively, are rectangularly shaped rather than L-shaped as in the first embodiment. While it may not be appreciated from the figures, the second embodiment is also smaller than the first embodiment, employing imaginary cubes having an edge length of 0.5L ("L" again being the edge length of the imaginary cubes of the first embodiment).

Figure 18:
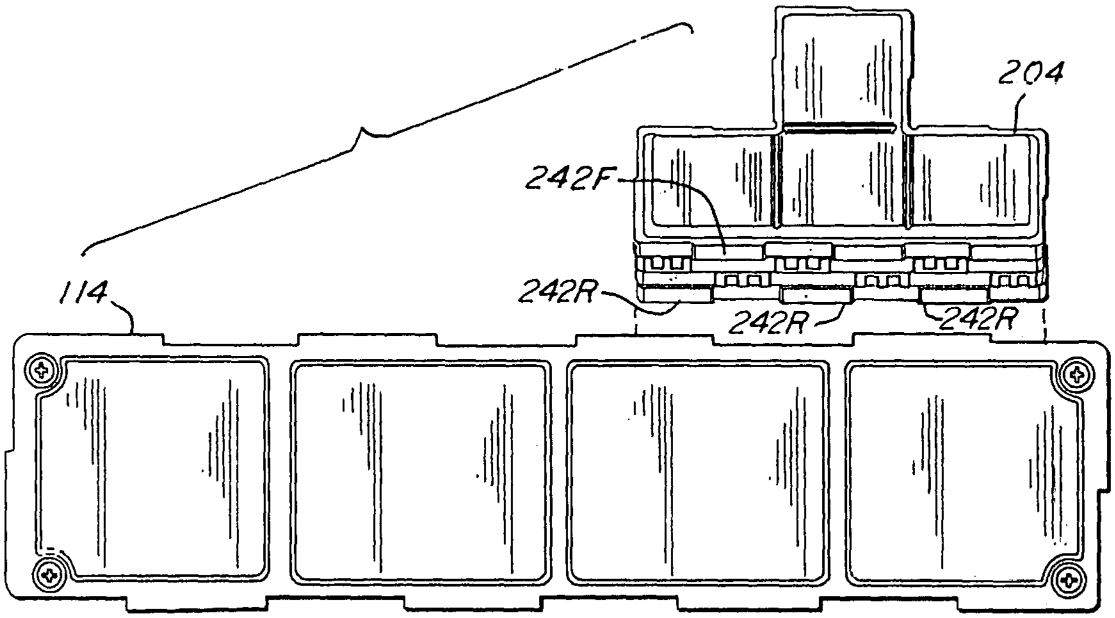
FIG. 18 is a front view of a slave block of the second embodiment being brought into proximity with a master block of the first embodiment.
Figure 19:
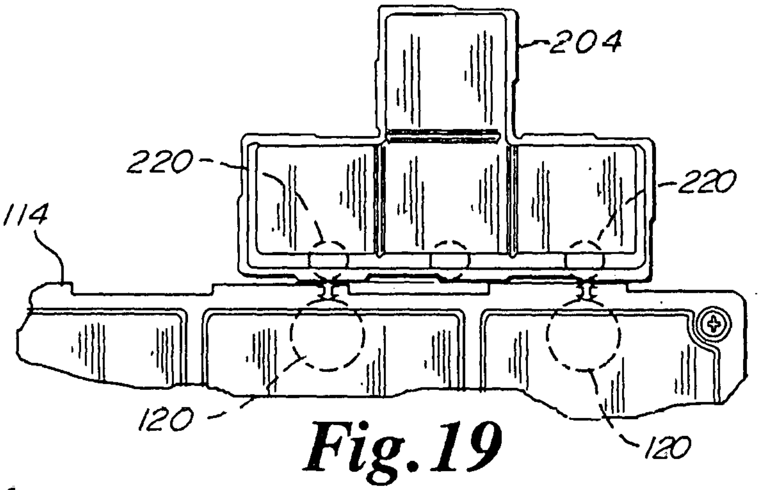
FIG. 19 is a front view of the blocks of FIG. 18 connected together.
Figure 20:
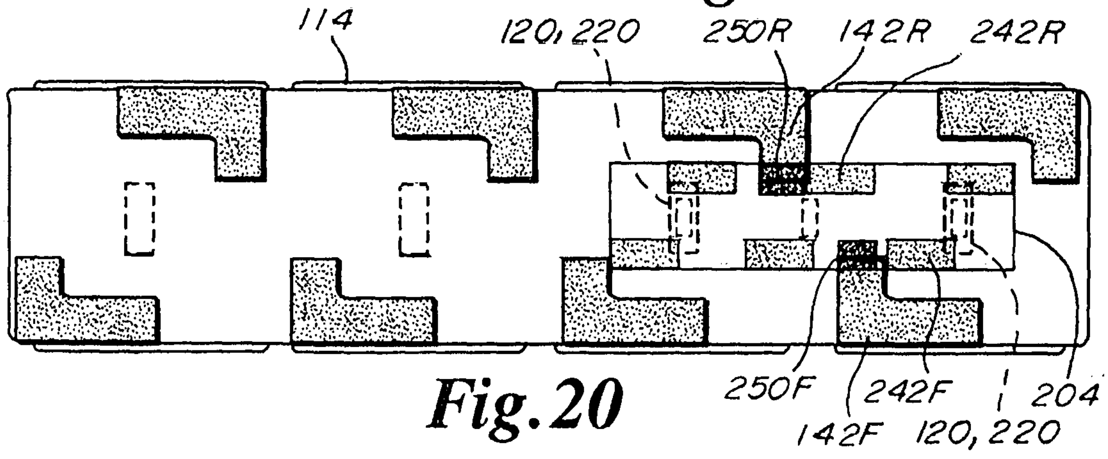
FIG. 20 is a top view of the blocks of FIG. 18 connected together.

FIG. 17A provides the relative dimensional configuration of the rectangularly shaped contacts. This dimensional arrangement also allows for electrical contact with adjoining blocks while preventing inadvertent short-circuiting by preventing the front or back contacts of one block contact from simultaneously touching both the front and the back contacts of another block. Additionally, this arrangement allows use of the blocks of the second embodiment to be used together and to properly function with the blocks of the first embodiment as shown in FIGS. 18 through 20, where it can be seen that the "L" spacing between the magnets 120 of block 114 align with the "L" spacing between the outermost magnets 220 of block 204 to cause the blocks to be attracted together and create electrical contact at portion 250F of contacts 142F and 242F, and at portion 250R of contacts 142R and 242R.

FIGS. 21 through 26 show various circuit diagrams useful in the blocks of the first and second embodiments. FIG. 21 is a diagram of charging module, flash module, step-up module, short-circuit protection and LED module circuit. FIG. 22 is a diagram of a USB-powered, short-circuit protection, and LED module circuit. FIG. 23 is a diagram of a USB-input, flash module, short-circuit protection, SPK module, output, and LED module circuit. FIG. 24 is a diagram of a charging module, flash module, step-up module, short-circuit protection and LED module circuit. FIG. 25 is a diagram of a USB-input, flash module, short-circuit protection, and LED module circuit. And FIG. 26 is a diagram of a charge module, step-up module, and LED module circuit.

The invention claimed is:

1. A modular lighting kit comprising a plurality of blocks, having a master block and a plurality of unpowered slave blocks; wherein

- each of the blocks includes electrical components including at least a light source;
- each of the blocks comprises a plurality of magnets;
- the master block includes an electrical power source;
- the light source of the master block is illuminable by the electrical power source;
- each of the blocks comprises a pair of electrically conductive peripheral frames;
- each of the frames is electrically isolated from the other of its pair except through the electrical components within the associated block; and
- each frame comprises evenly-spaced apart proud contacts; wherein
- the magnets cause aligned coupling between any two blocks brought into close proximity; and
- the proud contacts are shaped and configured to enable the two coupled blocks to connect electrically while preventing inadvertent short-circuiting of the pair of peripheral frames of one of the blocks by one of the peripheral frames of the other.

2. The kit of claim 1 wherein each of the blocks comprises a shape created by the aligned joining of identical cubes or any other shapes so long as the contacts are lined up in sync in 2D or 3D placement positions.

3. The kit of claim 2 wherein the shape is taken from the group including; an elongated row of the cubes, a T-shaped arrangement of the cubes, an X-shaped arrangement of the cubes, a Z-shaped arrangement of the cubes, an L-shaped arrangement of the cubes, a square arrangement of the cubes, a cubic arrangement of the cubes and a rectangular arrangement of the cubes.

4. The kit of claim 3 wherein each of the cubes is comprised of six square faces, including front and rear translucent square faces and at least two side square faces, and wherein the front and rear translucent square faces allow transmission of light from the light source of the associated block and the side faces comprise the proud contacts.

5. The kit of claim 4 wherein the proud contacts are disposed at diagonally opposed corners of the associated square faces.

6. The kit of claim 5 wherein the magnets are each disposed centrally between a pair of the diagonally opposed corners.

7. The kit if claim 6 wherein the magnets are cylindrically-shaped and comprised of semi-cylindrically-shaped opposite magnetic poles, and are retained by the blocks so that the opposite poles of the magnets of proximate blocks may rotate freely into magnetic attraction as the blocks are coupled.

8. The kit of claim 7 wherein each light source comprises a PC board having an electrical contact surface at each of two opposite ends thereof, and each of the contact surfaces is electrically and mechanically received by a different one of the associated block's pair of electrically conductive peripheral frames.

9. The kit of claim 8 wherein the pair of electrically conductive peripheral frames are comprised of metallically-plated plastic.

10. The kit of claim 9 wherein the pair electrically conductive peripheral frames are attached together by electrically conductive fasteners, and the metallically-plated plastic comprises non-conductive portions to prevent electrical short-circuiting between the pair by the fasteners.

11. The kit of claim 10 wherein the front and rear translucent square faces are comprised of an electrically non-conductive plastic housing.

12. The kit of claim 1 wherein each of the blocks comprises a shape created by the aligned joining of cubes, each cube having an edge length of L or some multiple thereof.

13. The kit of claim 12 wherein the shape is taken from the group including; an elongated row of the cubes, a T-shaped arrangement of the cubes, an X-shaped arrangement of the cubes, a Z-shaped arrangement of the cubes, an L-shaped arrangement of the cubes, a square arrangement of the cubes, a cubic arrangement of the cubes and a rectangular arrangement of the cubes.

14. The kit of claim 13 wherein each of the cubes is comprised of six square faces, including front and rear translucent square faces and at least two side square faces, and wherein the front and rear translucent square faces allow transmission of light from the light source of the associated block and the side faces comprise the proud contacts.

15. The kit of claim 14 wherein the proud contacts are disposed at diagonally opposed corners of the associated square faces.

16. The kit of claim 15 wherein the magnets are each disposed centrally between a pair of the diagonally opposed corners.

17. The kit if claim 16 wherein the magnets are cylindrically-shaped and comprised of semi-cylindrically shaped opposite magnetic poles, and are retained by the blocks so that the opposite poles of the magnets of proximate blocks may rotate freely into magnetic attraction as the blocks are coupled.

18. The kit of claim 17 wherein each light source comprises a PC board having an electrical contact surface at each of two opposite ends thereof, and each of the contact surfaces is electrically and mechanically received by a different one of the associated block's pair of electrically conductive peripheral frames.

19. The kit of claim 18 wherein the pair of electrically conductive peripheral frames are comprised of metallically-plated plastic.

20. The kit of claim 19 wherein the pair electrically conductive peripheral frames are attached together by electrically conductive fasteners, and the metallically-plated plastic comprises non-conductive portions to prevent electrical short-circuiting between the pair by the fasteners.

* * * * *